United States Patent [19]
Hannessian

[11] Patent Number: 5,959,089
[45] Date of Patent: Sep. 28, 1999

[54] AMINO-CYCLODEXTRIN SYNTHESES

[76] Inventor: Stephen Hannessian, 65 Gables Court, Beaconsfield, Quebec, Canada, H9W 5H3

[21] Appl. No.: 08/583,097

[22] PCT Filed: Jul. 19, 1994

[86] PCT No.: PCT/US94/08103

§ 371 Date: Jan. 16, 1996

§ 102(e) Date: Jan. 16, 1996

[87] PCT Pub. No.: WO95/03336

PCT Pub. Date: Feb. 2, 1995

[30] Foreign Application Priority Data

Jul. 19, 1993 [CA] Canada ................................. 2100820

[51] Int. Cl.$^6$ .................................................. C08B 37/16
[52] U.S. Cl. ...................... 536/18.7; 536/120; 536/123.1; 536/124
[58] Field of Search .................... 536/18.7, 120, 536/123.1, 124

[56] References Cited

U.S. PATENT DOCUMENTS 3,553,191 1/1971 Parmerter et al. .
5,198,429 3/1993 König et al. .
5,536,826 7/1996 Hirsenkorn .

OTHER PUBLICATIONS

Journal of Inclusion Phenomena and Molecular Recognition in Chemistry 14, pp. 25–36, 1992. The Properties and Potential Uses of Cyclodextrin Derivatives.
J. Org. Chem. 1992, 57, pp. 163–167, Artificial Redox Enzymes. 1. Synthetic Strategies, Ding Rong et al.
J. Org. Chem. 1990, 55, pp. 564–567, Asymmetric halogenation and Hydrohalogenation of trans–2–Butenoic Acid in a Crystalline α–Cyclodextrin Complex, Yoshio Tanaka et al.
Angew. Chem. Int. Ed. Engi. 1992, 31, No. 10, pp. 1381–1383. Synthesis and Complexation Properties of a Cyclodextrin–Derived Siderophor Analogue, Anthony W. Coleman et al.
Angew. Chem. Int. Ed. Engi. 1980, 19, pp. 344–362. Cyclodextrin Inclusion compounds in Research and Industry, Wolfram Saenger.
Chem. Rev. 1992, 92, pp. 1457–1470, Cyclodextrins and Their Applications in Analytical Chemistry, Song Li et al.
Helvetica Chimica Acta–vol. 61, Fasc. 6 (1978)–Nr. 203, pp. 2190–2218. Cyclodextrin Chemistry. Selective modification of all Primary Hydroxyl Groups of α–and β–Cyclodextrins, Joshua Boger et al.
Tetrahedron vol. 39, No. 9, pp. 1417–1474, 1983, Tetrahedron Report No. 147, Alan P. Croft et al.
Tetrahedron: Asymmetry vol. 1, No. 6, pp. 367–370, 1990. Intramolecular Host–Guest Complexes of D–and L–Mono–6–Phenylalanyl–Amino–6–Deoxy Cyclomalto–Heptaoses, Hélène Parrot–Lopez et al.
Tetrahedron Letters, vol. 31, No. 27, pp. 3897–3900, 1990. Polyaminocyclodextrins as Remarkably Active Catalysts for the Decarboxylation of Oxalacetate, Waichiro Tagaki et al.
Roy et al., Caplus AN 1995;745339 (1995.

*Primary Examiner*—Jeffrey C. Mullis
*Attorney, Agent, or Firm*—McFadden, Fincham

[57] ABSTRACT

There are disclosed certain amino or azido cyclodextrin ethers, which have similar or improved properties to known cyclodextrins. The novel compounds are substituted cyclodextrins having substituents comprising amino, azido, aralkoxycarbonylamino and certain ether-linked aminoalkyl, azidoalkyl, or alkenyl groups. Also disclosed are processes for preparing such compounds.

19 Claims, No Drawings

AMINO-CYCLODEXTRIN SYNTHESES

This invention relates to methods of synthesis of azido-cyclodextrins, haloalkyl-cyclodextrins, amino-cyclodextrins, amino-alkyl cyclodextrins, substituted amino-cyclodextrins and alkenyl cyclodextrins. Cyclodextrins are widely known as food and drug additives, as catalysts in chemical and industrial processes, and in numerous spectroscopic, analytical and preparative procedures, (see Li and Purdy, Chem. Rev. 1992, 92, 1457–1470, herein incorporated by reference). Their inclusion compounds are similarly widely known (see Saenger, Angew. Chem. Int. Ed. Engl. 1980, 19, 433–362, herein incorporated by reference).

The present invention primarily relates to processes of preparing substituted cyclodextrins. Specific reagents are utilized to produce specific products. The present invention secondarily provides novel compounds prepared by the process. Although the invention will be described and referred to as it relates to processes of preparation of azido-cyclodextrins, haloalkyl-cyclodextrins, amino-cyclodextrins, amino-alkyl cyclodextrins, substituted amino-cyclodextrins and alkenyl cyclodextrins and novel azido-cyclodextrins, haloalkyl-cyclodextrins, amino-cyclodextrins, amino-alkyl cyclodextrins, substituted amino-cyclodextrins and alkenyl cyclodextrins prepared thereby, it will be understood that the principles of this invention are equally applicable to similar processes and products, and accordingly it will be understood that the invention is not limited to such processes and products.

BACKGROUND OF THE INVENTION

Cyclodextrins are cyclic alpha-1,4-oligosaccharide starch derivates. Alpha, beta, gamma, and delta cyclodextrins are known, containing six, seven, eight, and nine glucose units respectively. Their importance lies in their enzymic properties attributed to their hollow truncated cone structure having primary 6-hydroxyls at the narrower end, and secondary 2- and 3-hydroxyls at the wider end, a relatively hydrophobic interior cavity and a relatively hydrophilic exterior.

The cyclodextrins form inclusion complexes and it is believed that these inclusion complexes and similar compounds modify the chemical and physical environment affecting chemical reactions to induce chirality in otherwise achiral reactions. The cyclodextrins are themselves inherently chiral being composed of chiral D-glucose units.

Substituted aminodeoxy cyclodextrins are particularly noted for their chiral catalytic effects (Tagaki et al., Tetrahedron Lett., 1990, 31, 3897–3900, Parrot-Lopez et al., Tetrahedron: Asymmetry, 1990, 1, 367–370, Angew. Chem. Int. Ed. Engl., 1992, 31, 1381–1383, incorporated herein by reference).

Azidodeoxy cyclodextrins are suitable precursors for aminodeoxy cyclodextrins.

It is a principal object of the invention to prepare azidodeoxy cyclodextrins and their amino derivatives.

In accordance with a broadest aspect of an embodiment of the invention there is provided a compound of formula

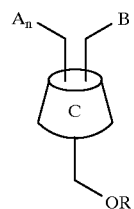

wherein C is cyclodextrin, A is amino, azido or aminocarbonyl aralkoxy, wherein said aralkoxy has 7 to 10 carbon atoms and n is 0, 1, 2 or 3, B is hydroxyl, or one of A and B is azido and the other is aminocarbonyl aralkoxy, R is hydrogen, alkyl of 1 to 6 carbon atoms, alkenyl of 2 to 6 carbon atoms, aminoalkyl of 1 to 6 carbon atoms, azidoalkyl of 1 to 6 carbon atoms, haloalkyl of 1 to 6 carbon atoms, alkylcarboalkoxy in which the alkyl and alkoxy groups have 1 to 6 carbon atoms each, with the proviso when R is aminoalkyl, azidoalkyl, or haloalkyl n is 0.

In a broadest aspect of another embodiment of the invention there is provided a process of preparation of a compound of formula

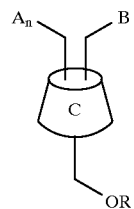

wherein C is cyclodextrin, A is amino, azido or aminocarbonyl aralkoxy, wherein said aralkoxy has 7 to 10 carbon atoms and n is 0, 1, 2 or 3, B is hydroxyl, or one of A and B is azido and the other is aminocarbonyl aralkoxy, R is hydrogen, alkyl of 1 to 6 carbon atoms, alkenyl of 2 to 6 carbon atoms, amin alkyl of 1 to 6 carbon atoms, azidoalkyl of 1 to 6 carbon atoms, haloalkyl of 1 to 6 carbon atoms, alkylcarboalkoxy in which the alkyl and alkoxy groups have 1 to 6 carbon atoms each, with the proviso when R is aminoalkyl, azidoalkyl, or haloalkyl n is 0. When A is azido, B is hydroxyl, n is 1, 2, or 3, a cyclodextrin of formula I, wherein C is cyclodextrin, B is hydroxyl, R is hydrogen, alkyl of 1 to 6 carbon atoms, or alkenyl of 2 to 6 carbon atoms, is reacted with alkali metal azide triphenyl phosphine, and carbon tetrabromide. When A is azido, B is aminocarbonyl aralkoxy, wherein said aralkoxy has 7 to 10 carbon atoms, n is 1, 2, or 3, a cyclodextrin of formula I, wherein C is cyclodextrin, A is aminocarbonyl aralkoxy, wherein said aralkoxy has 7 to 10 carbon atoms, B is hydroxyl, R is hydrogen, alkyl of 1 to 6 carbon atoms, or alkenyl of 2 to 6 carbon atoms, is reacted with alkali metal azide triphenyl phosphine, and carbon tetrabromide. When A is amino, B is hydroxyl, n is 1, 2, or 3, a cyclodextrin of formula I, wherein C is cyclodextrin, A is azido, B is hydroxyl, R is hydrogen, alkyl of 1 to 6 carbon atoms, or alkenyl of 2 to 6 carbon atoms, is reacted with hydrogen in the presence of palladium on charcoal. When A is aminocarbonyl aralkoxy, B is hydroxyl, n is 1, 2, or 3, a cyclodextrin of formula I wherein C is cyclodextrin, A is azido, B is hydroxyl, R is hydrogen, alkyl of 1 to 6 carbon atoms, or alkenyl of 2 to 6 carbon atoms, is reacted with sodium bicarbonate and aralkyl chloroformate, wherein said aralkyl has 7 to 10 carbon atoms. When n is 0, B is hydroxyl, R is azidoalkyl of 1 to 6 carbon atoms cyclodextrin is reacted with alkali metal hydride in a first step, and the product thereof with haloazidoalkane in a second step. When n is 0, B is hydroxyl, R is aminoalkyl of 1 to 6 carbon atoms, a cyclodextrin of formula I, wherein n is 0, B is hydroxyl, R is azidoalkyl of 1 to 6 carbon atoms is reacted with triphenylphosphine in the presence of ammonia. When n is 0, B is hydroxyl, R is alkyl of 1 to 6 carbon atoms or alkenyl of 2 to 6 carbon atoms cyclodextrin is reacted with alkali metal hydride in a first step and the product thereof with a reagent selected from the group consisting of alkyl or alkenyl iodides, and their bromo and chloro analogs in the presence of alkali metal iodide in a second step. When n is 0, B is hydroxyl, R is haloalkyl of 1 to 6 carbon atoms cyclodextrin is reacted with alkali metal hydride in a first step and the product thereof with a reagent selected from the group consisting of alpha-omega iodohaloalkanes, and their bromohalo analogs in the presence of alkali metal iodide in a second step.

In accordance with one aspect of one embodiment of the present invention there is provided a compound of formula

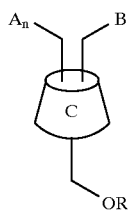

wherein C is cyclodextrin, A is azido and n is 0, 1, 2 or 3, R is hydrogen, alkyl of 1 to 6 carbon atoms, alkenyl of 2 to 6 carbon atoms, or azidoalkyl of 1 to 6 carbon atoms, with the proviso when R is azidoalkyl, n is 0.

In another aspect of the present invention, there is provided a process of preparation of a compound of formula

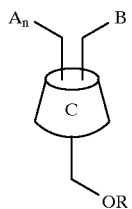

wherein C is cyclodextrin, A is azido and n is 0, 1, 2 or 3, R is hydrogen, alkyl of 1 to 6 carbon atoms, alkenyl of 2 to 6 carbon atoms, or azidoalkyl of 1 to 6 carbon atoms, with the proviso when R is azidoalkyl, n is 0, comprising when n is 1, 2, or 3 reacting a cyclodextrin of formula

wherein C is cyclodextrin, R is hydrogen, alkyl of 1 to 6 carbon atoms, or alkenyl of 2 to 6 carbon atoms, with alkali metal azide triphenylphosphine, and carbon tetrabromide, when n is 0 reacting cyclodextrin with alkali metal hydride in a first step, and the product thereof with haloazidoalkane in a second step.

Having thus generally described the invention, reference will now be made to the Examples.

EXPERIMENTAL DATA

EXAMPLE 1

2-O-Allyl-alpha-cyclodextrin

To a solution of dried α-cyclodextrin (2.88 g, 2.96 mmol) in DMSO (30 ml) was added lithium hydride (35 mg, 1.5 eq). The mixture was stirred under Argon until the solution became clear (24 hours). To this solution was added allyl bromide (256 $\mu$l, 1 eq) and lithium iodide (10 mg). The mixture was allowed to stand at 55 C for 4 hours. TLC on silica gel ($CH_3CN/H_2O$, 8/2) showed 3 products having Rf values of 0.28, 0.20, 0.09, and corresponding respectively to diallyl, monoallyl-α-cyclodextrins, and starting material. α-cyclodextrin and its derivatives were precipitated out by the addition of acetone (500 ml). The precipitate was filtered and washed with acetone (100 ml) to give 3 g of crude product which was purified by flash chromatography on a silica gel column (4×40 cm) eluting with $CH_3CN/H_2O$, 9/1 (1 liter) then 8/2 (1.5 liters). The pure fractions of monoallyl-α-cyclodextrin were combined, then concentrated in vacuo to give a solid (900 mg, 30%). The proton NMR spectra showed that it was a mixture of 2, and 6-O-allyl-α-cyclodextrins. The latter was present in about 20% (based on the integration of the alkenyl protons). Pure 2-O-monoallyl-α-cyclodextrin was obtained after recrystallization from $MeOH/H_2O$ (720 mg, 24%).

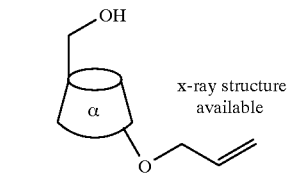

x-ray structure available mp 270° C. (dec). $[\alpha]^{25}$ +55° (c 0.1, $H_2O$). IR (KBr) 3400 (OH). $^1$H NMR (DMSO-d6, 300 MHz) δ: 3.20 (dd, 1H, $J_{2-1}$=3.3, $J_{2-3}$=9.0, H2$^A$) 3.22–3.48 (m, 21H, H2, H4, $H_2O$), 3.50–7.70 (m, 18H, H5, H6), 3.70–3.82 (m, 5H, H3), 3.85 (td, 1H, $J_{3-2}$=$J_{3-4}$=9.0, $J_{N3-OH}$=2.2, H3$^A$), 4.16 (dd, 1H, $J_{d-e}$=12.8, $J_{d-c}$=5.7, Hd), 4.28 (dd, 1H, $J_{e-d}$=12.8, $J_{e-c}$=5.7, He), 4.38–4.52 (m, 6H, OH6), 4.79 (s, 5H, H1), 4.95 (d, 1H, $J_{1-2}$=3.3, H1$^A$), 5.18 (dd, 1H, $J_{a-c}$=10.4, $J_{a-b}$=1.8, Ha), 5.29 (dd, 1H, $J_{b-c}$=17.3, $J_{b-a}$=1.8, Hb), 5.40–5.70 (m, 11H, OH2, OH3), 5.80–5.95 (m, 1H $J_{c-b}$=17.3, $J_{c-a}$=10.4, $J_{c-d}$=$J_{c-e}$=5.7, Hc).

$^{13}$C NMR (DMSO-d6, 300 MHz) δ: 60.1(C6), 71.9, 72.2 (C2, C5), 72.4 (allyl), 72.8 (c3$^A$), 73.2, 73.3, 73.4 (C3), 79.6 (C2$^A$), 82.2, 82.4 (C4), 82.8 (C4$^A$), 82.8 (C4$^A$), 100.2 (C1$^A$), 101.2, 102.0, 102.1, (C1), 117.7 (allyl), 134.8 (allyl).

FABMS $C_{39}H_{64}O_{30}$: 1035 (M+Na).

EXAMPLE 2

(i) 6-Azido-6-deoxy-alpha-cyclodextrin and
(ii) 6,6'-Diazido-6,6'-dideoxy-alpha-cyclodextrin

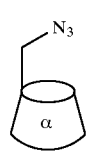

(i)

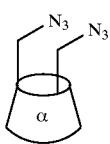
(ii)

To a solution of dried α-cyclodextrin (2.8 g, 2.88 mmol) in DMF (60 ml) were added lithium azide (1.40 g, 10 eq), triphenylphosphine (1.89 g, 2.5 eq) and carbontetrabromide (2.39 g, 2.5 eq). The addition of the latter caused a mildly exothermic reaction and the solution turned yellow. The reaction was stirred under Argon at room temperature for 6 hours. TLC on silica gel ($CH_3CN/H_2O$, 8/2) showed 3 major products having Rf values of 0.35, 0.20, 0.09, and corresponding respectively to diazido, monoazido-α-cyclodextrins and starting material. After addition of methanol (10 ml), the brown solution was concentrated to about half by rotary evaporation under reduced pressure, then poured into acetone (500 ml) to precipitate out α-cyclodextrin and its derivatives. The precipitate was filtered and washed with acetone (100 ml) to give 3 g of crude products which were purified by flash chromatography on a silca gel column (4×40 cm) eluting with $CH_3CN/H_2O$, 9/1 (2 liters) then 8/2 (1.5 liters). The pure fractions were combined, then concentrated in vacuo to give 6-azido-6-deoxy-α-cyclodextrin (570 mg, 20%), and 6,6'-diazido-6,6'-dideoxy-α-cyclodextrin (760 mg, 26%).

6-Azido-6-deoxy-α-cyclodextrin

mp 190° C. (dec) lit. 217° C. (dec), Carbohydr. Res., 1971, 18, 29–37) $[α]^{25}$ +133° (c 0.2, $H_2O$); (lit.+128° (c 0.4, $H_2O$), Carbohydr. Res., 1971, 18, 29–37) IR (KBr) 3400 (OH), 2100 ($N_3$). $^1H$ NMR (DMS)-d6, 300MHz) δ: 3.20–3.45 (m, 30H, H2, H4, $H_2O$), 3.52–3.70 (m, 18H, H5, H6), 3.71–3.87 (m, 6H, H3), 4.40–4.60 (m, 5H, OH6), 4.72–4.82 (m, 5H, H1), 4.83 (d, 1H, $J_{1-2}$=3.2, $H1^A$), 5.31–5.49 (m, 6H, OH3), 5.49–5.62 (m, 6H, OH2).

$^{13}C$ NMR (DMSO-d6, 300 MHz) δ: 51.3 ($C6^A$), 60.0–60.3 (C6), 70.4 ($C2^A$), 72.0, 72.2, 72.3, 72.4, 73.0 (C2, C5), 73.2 ($C3^A$), 73.3 (C3), 82.1, 82.2, 82.4 (C4), 83.2 ($C4^A$), 101.7 ($C1^A$), 102.0, 102.2, 102.3 (C1).

FABMS $C_{36}H_{59}O_{29}N_3$: 1020 (M+Na).

6,6'-Diazido-6,6'-dideoxy-α-cyclodextrin

Analytical reversed HPLC (μ-Bondapack C18 Column, 3.9×300 mm) showed that it is a mixture of 2 isomers in relative ratios of 75/25 as calculated from the peak areas on HPLC chromatogram.

36 mg of this mixture yielded by semi-preparative reversed phase HPLC (Novapak C18 Column, 7.8×300 mm) 21 mg, 80% of the major isomer and 6 mg, 70% of the minor one.

The determination of the structure of the 2 isomers was done by $^{13}C$ NMR and Körner's method. The major isomer is the AD isomer and the minor one is the AC isomer.

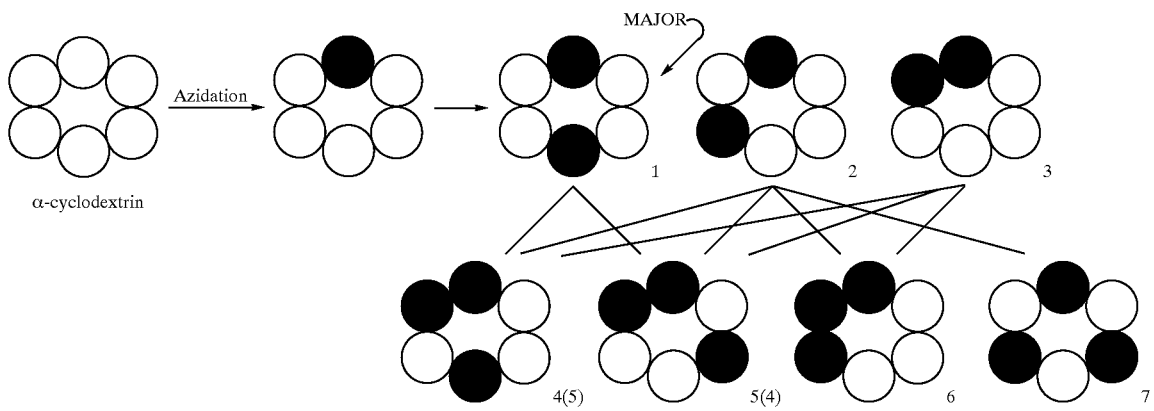

Isomer Determination of Di- and Triazido-α-cyclodextrin by Körners method (J. Am. Chem. Soc. 1986, 108,4509).

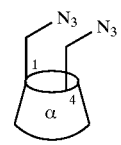

The AD isomer mp 165° C. (dec). $[α]^{25}$+77° (c 0.11, $H_2O$). IR (KBr) 3400 (OH), 2100 ($N_3$). $^1H$ NMR (DMSO-d6, 300 MHz) δ: 3.11–3.48 (m, 36H, H2, H4, $H_2O$), 3.48–3.70 (m, 18H, H5, H6), 3.70–3.90 (m, 6H, H3), 4.42–4.68 (m, 5H, OH6), 4.76 (d, 2H, $J_{1-2}$=3.6, H1), 4.78 (d, 2H, $J_{1-2}$=3.3, H1), 4.84 (d, 2H, $J_{1-2}$=2.4, $H1^A$), 5.30–5.72 (m, 12H, OH2, OH3).

$^{13}C$ NMR (DMSO-d6, 300 MHz) δ: 51.3 ($C6^A$), 60.0, 60.3 (C6), 70.4 ($c2^A$), 72.0, (C2), 72.1 (C5), 72.4 ($C5^A$), 73.0 ($C3^A$), 73.2 (C3), 82.2, 82.4 (C4), 83.2 ($C4^A$), 101.7 ($C1^A$), 102.0, 102.2 (C1).

FABMS $C_{58}H_{58}O_{28}N_6$: 1023 (M+H)

EXAMPLE 3

(i) 6-Azido-6-deoxy-alpha-cyclodextrin and
(ii) 6,6'-Diazido-6,6'-dideoxy-alpha-cyclodextrin and
(iii) 6,6',6"-Triazido-6,6',6"-trideoxy-alpha-cyclodextrin To a solution of dried α-cyclodextrin (2.5 g, 2.61 mmol) in DMF (60 ml) were added lithium azide (1.28 g, 10 eq), triphenylphosphine (2.05 g, 3 eq) and carbon tetrabromide (2.60 g, 3 eq). The addition of the latter caused a mildly exothermic reaction and the solution turned yellow. The reaction was stirred under Argon at room temperature for 6 hours. TLC on silica gel ($CH_3CN/H_2O$, 8/2) showed 4 major products having Rf values of 0.50, 0.35, 0.20, 0.09, and corresponding respectively to triazido, diazido, monoazido-α-cyclodextrin and starting material. After addition of methanol (10 ml), the brown solution was concentrated to about half by rotary evaporation under reduced pressure, then poured into acetone (500 ml) to precipitate out α-cyclodextrin and its derivatives. The precipitate was filtered and washed with acetone (100 ml) to give 3 g of crude products which were purified by flash chromatography on a silica gel column (4×40 cm) eluting with $CH_3CN/H_2O$, 9/1 (2 liter) then 8/2 (1.5 liter). The pure fractions were combined, then concentrated in vacuo to give: 6-Azido-6-deoxy-α-cyclodextrin (470 mg, 18%), 6,6'-diazido-6,6-dideoxy-α-cyclodextrin (mixture of 2 isomers, 670 mg, 25%), and 6,6',6"-triazido-6,6',6"-tridexoy-α-cyclodextrin (270 mg, 10%).

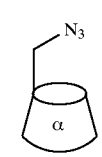

(i)

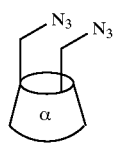

(ii)

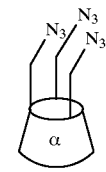

(iii)

6,6,6',6"-Triazido-6,6',6"-trideoxy-α-cyclodextrin

Analytical reversed phase HPLC (μ-Bondapak C18 Column, 3.9×300 mm) showed that it is a mixture of 3 isomers in relative ratios of 70/20/10 as calculated from the peak areas on HPLC chromatogram.
100 mg of this mixture yields by. semi preparative reversed HPLC (Novapak C18 Column, 7.8×300 mm) 16 mg, 80%, 50 mg, 70%, and 8 mg, 70% of pure isomers.

For 6,6',6"-triazido-6,6',6"-trideoxy-α-cyclodextrins: A quantity of the triazido product (100 mg) was purified by semi preparative reversed phase HPLC* as described above. Evaporation of three pooled fractions gave the following isomers.

For the ACE isomer: mp 178° C. (dec): $[\alpha]^{25}+165°$ (c 0.2, MeOH); IR (KBr) 3400 (OH), 2100 ($N_3$); $^1$H NMR (DMSO-d6, 300 MHz, the A, C, E notation refers to the glucose units bearing the azide group): δ: 3.25–3.55 (m, H2, H4, H6$^A$, H6$^C$, H6$^E$, $H_2O$), 3.55–3.83 (m, 24H, H5, H6, H3), 4.65–4.76 (m, 3H, OH6), 4.78 (d, 3H, $J_{H1-H2}$=3.2, H1), 4.85 (d, 3H, $J_{H1-H2}$=3.1, H1$^A$, H1$^C$, H1$^E$), 5.40–5.80 (m, 12H, OH2, OH3); $^{13}$C NMR (DMSO-d6, 100.6 MHz, the A, C, E notation refers to the glucose units bearing the azide group): δ51.3 (C6$^A$, C6$^C$, C6$^E$), 60.2 (C6), 70.4 (C5$^A$, C5$^C$, C5$^E$), 71.9 (C2, C5), 72.4 (C2$^A$, C2$^C$, C2$^E$), 73.0 (C3$^A$, C3$^C$, C3$^E$), 73.2 (C3), 82.5 (C4), 83.2 (C4$^A$, C4$^C$, C4$^E$), 101.8 (C4$^A$, C4$^C$, C4$^E$), 102.2 (C1); FABMS calcd for $C_{36}H_{57}O_{27}N_9$ 1048.3442 (M+H), found 1048.3324.

For the ABD and ABE: mp 190° C. (dec); $[\alpha]^{25}+144°$ (C 0.11, MeOH); IR (KBr) 3400 (OH), 2100 ($N_3$); $^1$H NMR (DMSO-d6, 300 MHz, the A, B, D and A, B, E notation refers to the glucose units bearing the azide group): δ: 3.25–3.48 (m, H2, H4, H6$^A$, H6$^B$, H6$^D$, and H6$^A$, H6$^B$, H6$^E$, $H_2O$), 3.51–3.88 (m, 24H, H5, H6, H3), 4.48–4.68 (m, 3H, OH6), 4.76–4.82 (m, 3H, H1), 4.86 (m, 3H, H1$^A$, H1$^B$, H1$^D$, and H1$^A$, H1$^B$, H1$^E$), 5.35–5.70 (m, 12H, OH2, OH3); $^{13}$C NMR (DMSO-d6, 100.6 MHz, the A, B, D and A, B, E notation refers to the glucose units bearing the azide group): δ51.1, 51.2, 51.4 (C6$^A$, C6$^B$, C6$^D$, and C6$^A$, C6$^B$, C6$^E$), 59.8, 59.9, 60.2 (C6), 70.1, 70.2, 70.3, 70.4, 70.5, 70.6 (C5$^A$, C5$^B$, C5$^D$, and C5$^A$, C5$^B$, C5$^E$), 71.7, 71.8, 71.9 (C2, C5), 72.2, 72.27, 72.3 (C2$^A$, C2$^B$, C2$^D$, and C2$^A$, C2$^B$, C2$^E$), 72.7, 72.8, 72.9 (C3$^A$, C3$^B$, C3$^D$, and C3$^A$, C3$^B$, C3$^E$), 73.1, 73.2 (C3), 82.0, 82.1, 82.3, 82.4, 82.5 (C4), 83.1, 83.3 (C4$^A$, C4$^B$, C4$^D$, and C4$^A$, C4$^B$, C4$^E$), 101.6, 101.68, 101.7, 101.74 (C1$^A$, C1$^B$, C1$^D$ and C1$^A$, C1$^B$, C1$^E$), 101.9, 102.0, 102.1, 102.2 (C1); FABMS calcd for $C_{36}H57O_{279}$ 1048.3442 (M+H), found 1048.3469.

For the ABC isomer: mp 160° C. (dec); $[\alpha]^{25}+141°$ (c 0.12, MeOH); IR (MeOH); IR (KBr) 3400 (OH), 2100 ($N_3$); $^1$H NMR (DMSO-d6, 300 MHz, the A, B, C notation refers to the glucose units bearing the azide group): δ: 3.20–3.48 (m, H2, H4, H6$^A$, H6$^B$, H6$^C$, $H_2O$), 3.49–3.90 (m, 24H, H5, H6, H3), 4.45–4.76 (m, 3H, OH6), 4.78–4.85 (m, 3H, H1), 4.88 (m, 3H, H1$^A$, H1$^B$, H1$^C$), 5.42–5.75 (m, 12H, OH2, OH3); $^{13}$C NMR (DMSO-d6, 100.6 MHz, the A, B, C notation refers to the glucose units bearing the azide group): δ51.3, 51.4 (C6$^A$, C6$^B$, C6$^C$), 59.8, 59.9, 60.2 (C6), 70.2, 70.4, 70.5 (C5$^A$, C5$^B$, C5$^C$), 71.7, 71.8, 71.9, 72.00, 72.07, 72.1, 72.3 (C2, C5), 72.7, 72.78, 72.8 (C3$^A$, C3$^B$, C3$^C$), 73.1, 73.2 (C3), 82.0, 82.2, 82.4 (C4), 83.3, 83.4 (C4$^A$, C4$^B$, C4$^C$), 101.7, 101.8, 101.9 (C1$^A$, C1$^B$, C1$^C$), 102.0, 102.1 (C1); FABMS calcd for $C_{36}H_{57}O_{27}N_9$ 1048.3442 (M+H), found 1048.3521.

The determination of the structure of the 3 isomers was done $^{13C}$ NMR and Körner's method. The isomer 7 on the HPLC chromatogram correspond to the ACE isomer, the isomer 4(5) to the ABD or ABE isomer and the isomer 5(4) to the ABE or ABD isomer.

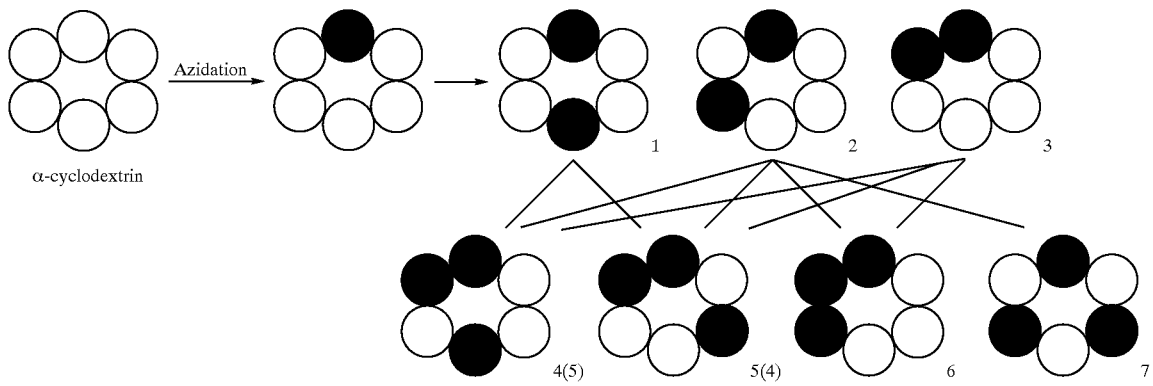

isomer Determination of Di- and Triazido-α-cyclodextrin by Körner's method (J. Am. Chem. Soc. 1986, 108, 4509).

EXAMPLE 3A (i) 6-Azido-6-deoxy-gamma-cyclodextrins
(ii) 6,6'-Diazido-6,6'-dideoxy-gamma-cyclodextrins Following the procedure described in Example 3, the above compounds were produced using gamma-cyclodextrin with the reactants otherwise identified.

For 6,6'-diazido-6,6'-dideoxy-γ-cyclodextrins: mp 195° C. (dec); $[\alpha]^{25\times}150.2°$ (c 0.22, MeOH); IR (KBr) 3400 (OH), 2100 ($N_3$); $^1H$ NMR (DMSO-d6, 400 MHz, the A notation refers to the glucose unit bearing the azide group): δ: 3.20–3.45 (m, H2, H4, H6$^A$, $H_2O$), 3.45–3.80 (m, H5, H6, H3), 4.40–4.62 (OH6), 4.80–4.90 (m, H1), 4.90–495 (m, H1$^A$), 5.60–5.85 (m, OH2, OH3); $^{13}C$ NMR (DMSO-d6, 100.6 MHz, the A notation refers to the glucose unit bearing the azide group): δ: 51.9, 52.2 (C6$^A$), 60.8 (C6), 71.1, 71.3 (C5$^A$), 73.0, 73.3, 73.5, 73.6, 73.7 (C2, C3, C5), 81.4, 81.6, 81.8, 82.1 (C4), 83.5, 83.6 (C4$^A$), 102.0, 102.3, 102.4, 102.6, 103.0, 103.1 (C1); FABMS.

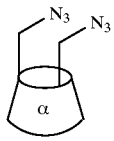

EXAMPLE 4

2-O-Allyl-6-azido-6-deoxy-alpha-cyclodextrin and 2-O-Allyl-6,6'-diazido-6,6'-dideoxy-alpha-cyclodextrin To a solution of dried 2-O-allyl-α-cyclodextrin (872 mg, 0.86 mmol) in DMF (30 ml) were added lithium azide (420 mg, 10 eq), triphenylphosphine (564 mg, 2.5 eq) and carbon tetrabromide (715 mg, 2.5 eq). The addition of the latter caused a mildly exothermic reaction and the solution turned yellow. The reaction was stirred under Argon at room temperature for 6 hours. TLC on silica gel ($CH_3CN/H_2O$, 8/2) showed 3 major products having Rf values of 0.54, 0.40, 0.20, and corresponding respectively to diazido-monoallyl-α-cyclodextrin, monoazido-monoallyl-α-cyclodextrin and starting material. After addition of methanol (5 ml), the brown solution was concentrated to about 3 ml by rotary evaporation under reduced pressure, then applied on a silica gel column (4×40 cm) eluting with $CH_3CN/H_2O$, 92/8 (11), 90/10 (1.51), then 85/15 (1.51). The pure fractions were combined, then concentrated in vacuo to give: 2-O-allyl-6-azido-6-deoxy-α-cyclodextrin (320 mg, 36%), and 2-O-allyl-6,6'-diazido-6,6'-dideoxy-α-cyclodextrin (160 mg, 20%).

2-O-allyl-6-azido-6-deoxy-α-cyclodextrin

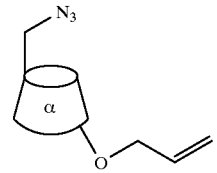

mp=175° C. (dec). $[\alpha]^{25}=153°$ (c 0.1, $H_2O$). IR (KBr) 3400 (OH), 2100 ($N_3$). $^1H$ NMR (DMSO-d6, 300 MHz) δ: 3.15–3.49 (m, 20H, H2, H4, $H_2O$), 3.49–370 (m, 18H, H5, H6), 3.70–3.87 (m, 5H, H3), 3.87–3.90 (m, 1H, H3$^A$), 4.16 (dd, 1H, $J_{d-e}$=12.8, $J_{d-c}$=5.7, Hd), 4.28 (dd, 1H, $J_{e-d}$=12.8, $J^{e-c}$=5.7, He), 4.38–4.65 (m, 5H, OH6), 4.78, 4.84, 4.96, 5.02 (s, 6H, H1, H1$^A$), 5.17 (d, 1H, $J_{a-c}$=10.3, Ha), 5.29 (d, 1H, $J_{b-c}$=17.3, Hb), 5.37–5.78 (m, 11H, OH2, OH3), 5.78–5.96 (m, 1H, Hc).

$^{13}C$ NMR (DMSO-d6, 300 MHz) δ: 51.3 (C6$^A$), 60.1, 60.31, 60.33 (C6), 70.4, 71.7, 71.9, 72.0, 72.1, 72.3, 72.4 (C2, C5), 72.7 (allyl), 73.0 (C3$^A$), 73.1, 73.2, 73.3 (C3), 79.6 (C2$^A$), 82.1, 82.2, 82.4, 82.5 (C4), 83.2 (C4$^A$), 101.80, 101.82 (C1$^A$), 102.00, 102.07, 102.2 (C1), 117.8 (allyl), 134.8 (allyl).

FABMS $C_{39}H_{63}O_{29}N_3$: 1060 (M+Na).

2-O-allyl-6,6'-diazido-6,6'-dideoxy-α-cyclodextrin

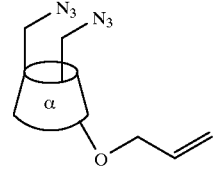

mp=172° C. (dec). $[\alpha]^{25}+131°$ (c 0.1, $H_2O$). IR (KBr) 3400 (OH), 2100 ($N_3$). $^1H$ NMR (DMSO-d6, 300 MHz) δ: 3.20–3.48 (m, H2, H4, $H_2O$), 3.48–3.69 (m, 18H, H5, H6), 3.69–3.88 (m, 5H, H3), 3.88–3.98 (m, 1H, H3$^A$), 4.16 (dd, 1H, $J_{d-e}$=12.8, $J_{d-c}$=5.7, Hd), 4.28 (dd, 1H, $J_{e-d}$=12.8, $J_{e-c}$=

5.7, He), 4.50–4.70 (m, 4H, OH6), 4.77, 4.79, 4.83, 4.95, 5.00 (s, 6H, H1, H1$^A$), 5.18 (d, 1H, J$_{a-c}$=10.3, Ha), 5.29 (d, 1H, J$_{b-c}$=17.3, Hb), 5.37–5.78 (m, 11H, OH2, OH3), 5.78–5.96 (m, 1H, Hc).

$^{13}$C NMR (DMSO-d6, 300 MHz) δ: 51.3 (C6$^A$), 60.0, 60.4 (C6), 70.4, 71.8, 72.0, 72.1, 72.2, 72.3, 72.4 (C2, C5), 72.7 (allyl), 73.0 (C3$^A$), 73.3, 73.5, 73.6 (C3), 79.4 (C2$^A$), 82.3, 82.5, 83.2, 83.3 (C4), 101.8, 101.9 (C1$^A$), 102.0, 102.2 (C1), 117.7 (allyl), 134.8, 134.9 (allyl). FABMS C$_{39}$H$_{62}$O$_{28}$N$_6$: 1085 (M+Na).

EXAMPLE 5

2-O-Allyl-6-azido-6-deoxy-alpha-cyclodextrin and 2-O-Allyl-6,6'-diazido-6,6'-dideoxy-alpha-cyclodextrin and 2-O-Allyl-6,6',6"-triazido-6,6',6"-trideoxy-alpha-cyclodextrin To a solution of dried 2-O-allyl-α-cyclodextrin (740 mg, 0.73 mmol) in DMF (30 ml) were added lithium azide (358 mg, 10 eq), triphenylphosphine (574 mg, 3 eq) and carbon tetrabromide (728 mg, 3 eq). The addition of the latter caused a mildly exothermic reaction and the solution turned yellow. The reaction was stirred under Argon at room temperature for 6 hours. TLC on silica gel (CH$_3$CN/H$_2$O, 8/2) showed 3 major products having Rf values of 0.68, 0.54, 0.40, and corresponding respectively to triazido-monoallyl-α-cyclodextrin, diazido-monoallyl-α-cyclodextrin and monoazido-monoallyl-α-cyclodextrin. After addition of methanol (5 ml), the brown solution was concentrated to about 3 ml by rotary evaporation under reduced pressure, then applied on a silica gel column (4×40 cm) eluting with CH$_3$CN/H$_2$O, 92/8 (1l), 90/10 (1.5l), then 85/15 (1.5l). The pure fractions were combined, then concentrated in vacuo to give: 2-O-allyl-6-azido-6-deoxy-α-cyclodextrin (200 mg, 26%), 2-O-allyl-6,6'-diazido-6,6'-dideoxy-α-cyclodextrin (260 mg, 33%) and 2-O-allyl-6,6',6"-triazido-6,6',6"-trideoxy-α-cyclodextrin (214 mg, 27%).

2-O-allyl-6,6',6"-triazido-6,6',6"-trideoxy-α-cyclodextrin

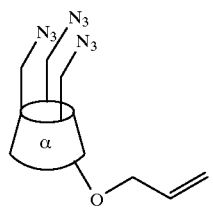

mp=168° C. (dec). [α]$^{25}$+110° (c 0.11, MeOH). IR (KBr) 3400 (OH), 2100(N$_3$). $^1$H NMR (DMSO-d6, 300 MHz) δ: 3.18–3.42 (m, H2, H4, H$_2$O), 3.45–3.64 (m, 18H, H5, H6), 3.64–3.82 (m, 5H, H3), 3.82–3.95 (m, 1H, H3$^A$), 4.12 (dd, 1H, J$_{d-e}$=12.8, J$_{d-c}$=5.7, Hd), 4.25 (dd, 1H, J$_{e-d}$=12.8, J$_{e-c}$=5.7, He), 4.50–4.70 (m, 3H, OH6), 4.72, 4.80, 4.90, 4.98 (s, 6H1, H1$^A$), 5.11 (d, 1H, J$_{a-c}$=10.3, Ha), 5.25 (d, 1H, J$_{b-c}$=17.3, Hb), 5.35–5.70 (m, 11H, OH2, OH3), 5.75–5.95 (m, 1H, Hc).

$^{13}$C NMR (DMSO-d6, 300 MHz) δ: 51.2, 51.3 (C6$^A$), 60.3 (C6), 70.3, 71.7, 71.8, 72.0, 72.1, 72.3, (C2, C5), 72.7 (allyl), 73.0, 73.1, 73.2 (C3), 79.2, 79.3 (C2$^A$), 82.6, 82.8, 83.1, 83.3 (C4), 101.6, 101.7, 101.8 (C1$^A$), 102.00, 102.03, 102.1 (C1), 117.6, 117.7 (allyl), 134.7, 134.8 (allyl).

FABMS C$_{39}$H$_{61}$O$_{27}$N$_9$: 1110 (M+Na).

EXAMPLE 6

Alphahalo-omega-azidohaloalkane

1-Iodo-n-azidoalkanes

Preparation of Chloroazidoalkanes

To a solution of 1-bromo-n-chloroalkane (50 mmol) in DMSO (50 ml) was added sodium azide (3.25 g, 1 eq). The solution was stirred at room temperature for 20 hours, then diluted with water (100 ml), and extracted with ether (2×100 ml). The organic layers were combined, then dried over anhydrous sodium sulfate. The residue obtained after removal of the solvent was used without further purification.

1-Chloro-3-azidopropane

Yield 80% $^1$H NMR (CDCl$_3$, 300 MHz): 2.00 (quint, 2H, J=6.2), 3.48 (t, 2H, J=6.4), 3.62 (t, 2H, J=6.2).

1-Chloro-4-azidobutane

Yield 86% $^1$H NMR (CDCl$_3$, 300 MHz): 1.60–2.00 (m, 4H), 3.31 (t, 2H, J=6.2), 3.54 (t, 2H, J=6.2).

1-Chloro-5-azidopentane

Yield 90% $^1$H NMR (CDCl$_3$, 300 MHz): 1.47–1.68 (m, 4H), 1.80 (quint, 2H, J=7.3), 3.29 (t, 2H, J=6.4), 3.54 (t, 2H, J=6.5)

Preparation of Iodoazidoalkanes

A solution of chloroazidoalkane (50 mmol) and sodium iodide (7.5 g, 2 eq) in acetone was heated at reflux for 20 hours. After removal of the solvent in vacuo, the residue was diluted with water (30 ml), then extracted with ether (2×50 ml). The organic layers were combined, dried over anhydrous sodium sulfate. The residue obtained after removal of the solvent was purified by distillation.

1-Iodo-3-azidopropane

Yield 71% Eb$_{0.1}$ 20–25° C. $^1$H NMR (CDCl$_3$, 300 MHz) δ: 2.04 (quint, 2H, J=7.3), 3.25 (t, 2H, J=6.7), 3.43 (t, 2H, J=6.6).

1-Iodo-4-azidobutane

Yield 75% Eb$_{0.1}$ 60° C. $^1$H NMR (CDCl$_3$, 300 MHz) δ: 1.65–1.76 (m, 2H), 1.85–1.97 (m, 2H), 3.20 (t, 2H, J=6.7), 3.31 (t, 2H, J=6.6).

1-Iodo-5-azidopentane

Yield 80% Eb$_{0.1}$ 70° C. $^1$H NMR (CDCl$_3$, 300 MHz) δ: 1.42–1.56 (m, 2H), 1.56–1.68 (m, 2H), 1.78–1.90 (quint, 2H, J=7.3), 3.19 (t, 2H, J=6.8), 3.29 (t, 2H, J=6.6)

EXAMPLE 7

2-O-Azidoalkyl-beta-cyclodextrin

To a solution of dried β-cyclodextrin (2.4 g, 2.11 mmol) in DMSO (15 ml) was added lithium hydride (26.mg, 1.5 eq). The mixture was stirred under Argon until the solution became clear (24 hours). To this solution was added 1-iodo-n-azidoalkane (1.5 eq). The mixture was allowed to stand at 60° C. for 10 hours. TLC on silica gel (CH$_3$CN/H$_2$O, 8/2) showed 3 products corresponding to dialkyl, monoalkyl-β-cyclodextrin, and starting material. After evaporation of DMSO in vacuo, the residue was dissolved in water (5 ml), then applied on a silica gel column (4×40 cm). Elution with CH$_3$CN/H$_2$O, 9/1 removed the dialkyl, monoalkyl derivatives, and starting material were eluted with CH$_3$CN/H$_2$O, 8/2. The pure fractions of monoalkyl-β-cyclodextrin were combined, then concentrated in vacuo to give a solid.

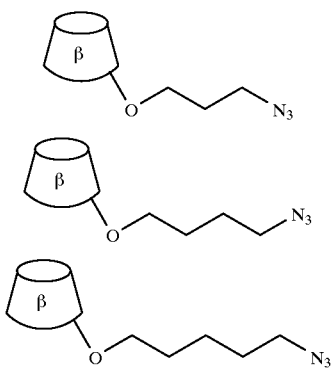

2-O-Azidopropyl-β-cyclodextrin

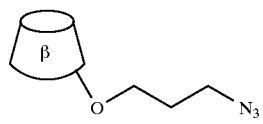

Yield 25% mp 210° C. (dec). $[\alpha]^{25}$+141.3° (c 0.22, MeOH). IR (KBr) 3400 (OH), 2100 ($N_3$). $^1$H NMR (DMSO-d6, 300 MHz) δ: 1.68–1.85 (m, 2H propyl), 3.00–3.48 (m, 3OH, H2, H4, propyl, $H_2O$), 3.49–3.90 (m, 3OH, H3, H5, H6, propyl), 4.40–4.60 (m, 7H, OH6), 4.78–4.90 (m, 6H, H1), 4.95–5.05 (m, 1H, H1$^A$), 5.60–6.10 (m, 13H, OH2, OH3).

$^{13}$C NMR (DMSO-d6, 300 MHz) δ: 28.9, 47.6 (propyl), 60.0 (C6), 68.9 (propyl), 71.9, 72.1, 72.3, 72.5 (C2, C5), 72.7 (C3$^A$), 73.1 (C3), 80.8 (C2$^A$), 81.6, 81.7 (C4), 82.2 (C4$^A$), 100.2 (C1$^A$), 101.9, 102.0 (C1).

FABMS $C_{45}H_{75}O_{35}N_3$: 1240 (M+Na).

2-O-Azidobutyl-β-cyclodextrin

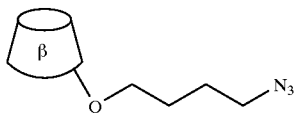

Yield 25% mp 210° C. (dec). $[\alpha]^{25}$+127.1° (c 0.22, $H_2O$). IR (KBr) 3400 (OH), 2100 ($N_3$). $^1$H NMR (DMSO-d6, 300 MHz) δ: 1.50–1.65 (m, 4H, butyl), 3.22 (dd, 1H, $J_{2-1}$=3.3, $J_{2-3}$=10.0, H2$^A$), 3.22–3.48 (m, 3OH, H1, H4, butyl, $H_2O$), 3.48–3.82 (m, 3OH, H2, H5, H6, butyl), 4.45 (t, 7H, $J_{H6-OH}$=5.2, OH6), 4.78–4.86 (m, 6H, H1), 4.96 (d, 1H, $J_{1-2}$=3.5, H1$^A$), 5.55–6.00 (m, 13H, OH2, OH3).

$^{13}$C NMR (DMSO-d6, 300 MHz) δ: 24.8, 26.5, 50.5 (butyl), 60.0 (C6), 71.3 (butyl), 71.8, 71.9, 72.1, 72.3, 72.5 (C2, C5), 72.8 (C3$^A$), 73.1, 73.2 (C3), 80.7 (C2$^A$), 81.6, 81.8, 81.9 (C4), 82.3 (C4$^A$), 100.4 (C1$^A$), 101.9, 102.0 (C1).

FABMS $C_{46}H_{77}O_{35}N_3$: 1254 (M+Na).

2-O-Azidopentyl-β-cyclodextrin

Yield 30% mp 230° C. (dec). $[\alpha]^{25}$+115.5° (c 0.20, MeOH). IR (KBr) 3400 (OH), 2100 ($N_3$). $^1$H NMR (DMSO-d6, 300 MHz) δ: 1.28–1.40 (m, 2H, pentyl), 1.47–1.60 (m, 4H pentyl), 3.21 (dd, 1H, $J_{2-1}$=3.3, $J_{2-3}$=9.71 H2$^A$), 3.21–3.48 (m, 3OH, H2, H4, pentyl, $H_2O$), 3.48–3.82 (m, 3OH, H3, H5, H6, pentyl), 4.47 (t, 7H, $J_{H6-OH}$=5.3, OH6), 4.78–4.87 (m, 6H, H1), 4.96 (d, 1H, $J_{1-2}$=3.3, H1$^A$), 5.55–6.00 (m, 13H, OH2, OH3).

$^{13}$C NMR (DMSO-d6, 300 MHz) δ:22.5, 28.0, 50.6 (pentyl), 60.0 (C6), 71.7 (pentyl), 71.8, 72.1, 72.3, 72.5 (C2, C5), 72.8 (C3$^A$), 73.1 (C3), 80.7 (C2$^A$), 81.6, 81.8 (C4), 82.3 ($C_4$ $^A$), 100.4 (C1$^A$), 101.9, 102.0 (C1).

FABMS $C_{47}H_{79}O_{35}N_3$: 1268 (M+Na).

EXAMPLE 8

2-O-Azidoalkyl-alpha-cyclodextrin and 3-O-Azidoalkyl-alpha-cyclodextrin

To a solution of dried α-cyclodextrin (2.4 g, 2.46 mmol) in DMSO (15 ml) was added lithium hydride (30 mg, 1.5 eq). The mixture was stirred under Argon until the solution became clear (24 hours). To this solution was added 1-iodo-n-azidoalkane (1.5 eq). The mixture was allowed to stand at 60° C. for 10 hours. TLC on silica gel ($CH_3CN/H_2O$, 8/2) showed 3 products corresponding to dialkyl, monoalkyl-α-cyclodextrin, and starting material. After evaporation of DMSO in vacuo, the residence was dissolved in water (5 ml), then applied on a silica gel column (4×40 cm). Elution with $CH_3CN/H_2O$, 9/1 removed the dialkyl, monoalkyl derivatives, and starting material were eluted with $CH_3CN/H_2O$, 8/2. The pure fractions of monoalkyl-α-cyclodextrin were combined, then concentrated in vacuo to give a solid. The $^{13}$C NMR spectra showed that the alkylation had occurred at C-2 and C-3 positions at almost the same ratio.

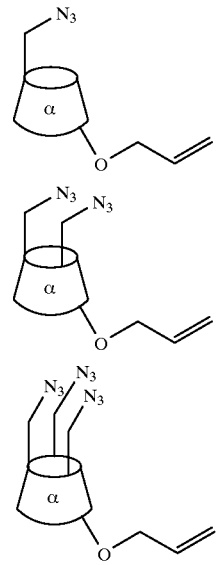

2-O-Azidopropyl-α-cyclodextrin and 3-O-Azidopropyl-α-cyclodextrin

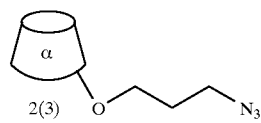

Yield 30% mp 165° C. (dec). $[\alpha]^{25}$+136.4° (c 0.22, MeOH). IR (KBr) 3400 (OH), 2100 ($N_3$). $^1$H NMR (DMSO-d6, 300 MHz) δ: 1.68–1.82 (m, 2H, propyl), 3.18 (dd, 1H, $J_{2\text{-}1}$ 3.3, $J_{2\text{-}3}$=9.4, H2$^A$), 3.20–3.48 (m, 26H, H2, H4, propyl, H$_2$O), 3.48–3.88 (m, 25H, H3, H5, H6, propyl), 3.90 (td, 1H, $J_{3\text{-}2}$=$J_{3\text{-}4}$=8.9, $J_{H3\text{-}OH}$=2.9, H3$^A$), 5.35–5.75 (m, 11H, OH2, OH3).

On the $^{13}$C NMR spectrum the peaks corresponding to 2-O-Azidopropyl-α-cyclodextrin were assigned as following:

$^{13}$C NMR (DMSO-d6, 300 MHz) δ: 28.9, 47.6 (propyl), 60.0 (C6), 68.6 (propyl), 71.9, 72.2 (C2, C5), 72.8 (C3$^A$), 73.2, 73.4 (C3), 80.6 (C2$^A$), 81.8, 82.2, 82.4 (C4), 82.7 (C4$^A$), 100.0 (C1$^A$), 102.1, 102.2 (C1).

FABMS $C_{39}H_{65}O_{30}N_3$: 1078 (M+Na).

2-O-Azidobutyl-α-cyclodextrin and 3-O-Azidobutyl-α-cyclodextrin

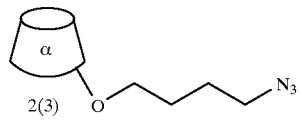

Yield 36% mp 220° C. (dec). $[\alpha]^{25}$+123.5° (c 0.37, MeOH). IR (KBr) 3400 (OH), 2100 (N$_3$). $^1$H NMR (DMSO-d6, 300 MHz) δ: 1.45–1.65 (m, 4H, butyl), 3.18 (dd, 1H, $J_{2\text{-}1}$=3.0, $J_{2\text{-}3}$=9.8, H2$^A$), 3.22–3.48 (m, 26H, H2, H4, butyl, H$_2$O), 3.48–3.82 (m, 23H, H3, H5, H6), 3.84–3.96 (m, 3H, H3$^A$, butyl), 4.39–4.60 (m, 6H, OH6), 4.74–4.84 (m, 5H, H1), 4.95 (d, 1H, $J_{1\text{-}2}$=3.1, H1$^A$), 5.32–5.80 (m, 11H, OH2, OH3).

On the $^{13}$C NMR spectrum the peaks corresponding to 2-O-Azidobutyl-α-cyclodextrin were assigned as following:

$^{13}$C NMR (DMSO-d6, 300 MHz) δ: 24.8, 26.6, 50.6 (butyl), 60.0 (C6), 71.0 (butyl), 71.9, 72.2 (C2, C5), 72.8 (C3$^A$), 73.1, 73.2, 73.3, 73.4 (C3), 80.4 (C2$^A$), 81.8, 82.1, 82.4 (C4), 82.7 (C4$^A$), 102.0, 102.1 (C1).

FABMS $C_{40}H_{67}O_{30}N_3$: 1092 (M+Na).

2-O-Azidopentyl-α-cyclodextrin and 3-O-Azidopentyl-α-cyclodextrin

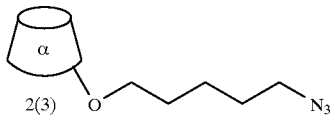

Yield 30% mp 235° C. (dec). $[\alpha]^{25}$+108.5° (c 0.37, MeOH). IR (KBr) 3400 (OH), 2100 (N$_3$).

$^1$H NMR (DMSO-d6, 300 MHz) δ: 1.28–1.40 (m, 2H, pentyl), 1.42–1.60 (m, 4H pentyl), 3.12–3.19 (m, 1H, H2$^A$), 3.19–3.45 (m, 26H, H2, H4, pentyl, H$_2$O), 3.45–3.82 (m, 23H, H3, H5, H6), 3.82–3.95 (m, 3H, H3$^A$, pentyl), 4.40–4.58 (m, 6H, OH6), 4.74–4.85 (m, 5H, H1), 4.94 (d, 1H, $J_{1\text{-}2}$=3.1, H1$^A$), 5.33–5.72 (m, 11H, OH2, OH3).

On the $^{13}$C NMR spectrum the peaks corresponding to 2-O-Azidopentyl-α-cyclodextrin were assigned as following:

$^{13}$C NMR (DMSO-d6, 300 MHz) δ: 22.5, 28.0, 28.9, 50.6 (pentyl), 60.0 (C6), 71.4 (pentyl), 71.7, 71.9, 72.2, 72.3 (C2, C5), 72.8 (C3$^A$), 73.2, 73.3, 73.4, 73.6 (C3), 80.4 (C2$^A$), 81.8, 82.1, 82.4 (C4), 82.7 (C4$^A$), 100.1 (C1$^A$), 101.9, 102.0, 102.1, 102.2 (C1).

FABMS $C_{41}H_{69}O_{30}N_3$: 1106 (M+Na).

EXAMPLE 9

2-O-(3-Aminopropyl)-β-cyclodextrin

To a suspension of 2-O-(3-Azidopropyl)-β-cyclodextrin (100 mg, 0.08 mmol) in dioxane-methanol (10:2 mL) was added triphenylphosphine (100 mg, 0.38 mmol). After 1 hour, 1 mL of concentrated ammonia was added, and stirring was continued for 20 h. After removal of the solvents in vacuo, the white residue was suspended in water (20 mL), then washed twice with dichloromethane (10 mL). The solution was concentrated in vacuo, then applied on a reverse phase column (Lichroprep C18, 2×20 cm). A stepwise elution with 500 mL of water, then 300 mL of 5% aqueous MeOH gave the pure amine (60 mg, 61%). Rf 0.22 (n-butanol-acetic acid-water-pyridine, 15:3:12:10); mp 210° C. (dec); $[\alpha]^{25}$+137.6° (c 0.25, H$_2$O); $^1$H NMR (D$_2$O, 300 MHz, the A notation refers to the glucose unit bearing the aminopropyl group): δ1.82–1.96 (m, 2H, propyl), 2.95–3.05 (m, 2H, propyl), 3.43–3.52 (m, 1H, H2$^A$), 3.43–4.09 (m, 43H, H2, H3, H4, H5, H6, propyl), 5.04–5.10 (m, 6H, H1), 5.18–5.24 (m, 1H, H1$^A$); $^{13}$C NMR (D$_2$O, 75.5 MHz, the A notation refers to the glucose unit bearing the aminopropyl group): δ27.0, 35.8 (propyl), 58.6 (C6), 68.0 (propyl), 69.9, 70.1, 70.2, 70.3 (C2, C5), 71.3, 71.4 (C3), 78.7 (C2$^A$), 79.4, 79.6 (C4), 79.7 (C4$^A$), 98.1 (C1$^A$), 100.0, 100.1 (C1); FABMS calcd for $C_{45}H_{77}O_{35}N_3$ 1192.4354 (M+H), found 1192.4405.

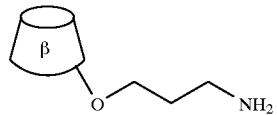

EXAMPLE 10

2-O-(4-Aminobutyl)-β-cyclodextrin

Essentially the same procedure as in the preceeding example was used to give the product as a colorless solid, yield 80%. Rf 0.28 (n-butanol-acetic acid-water-pyridine, 15:3:12:10); mp 203° C. (dec); $[\alpha]^{25}$+136.4° (c 0.25, H$_2$O); $^1$H NMR (DMSO-d6, 300 MHz, the A notation refers to the glucose unit bearing the aminobutyl group): δ1.30–1.70 (m, 4H, butyl), 2.56–2.75 (m, 2H, butyl), 3.00–3.85 (m, 44H, H2, H3, H4, H5, H6, butyl), 4.35–4.58 (m, 7H, OH6), 4.78–4.88 (m, 6H, H1), 4.95 (d, 1H, $J_{H1\text{-}H2}$=2.5, H1$^A$), 5.60–6.00 (m, 13H, OH2, OH3); $^{13}$C NMR (DMSO-d6, 75.5 MHz, the A notation refers to the glucose unit bearing the aminobutyl group): δ26.8, 27.5, 40.4 (butyl), 60.0, 60.10, 60.11 (C6), 71.7 (butyl), 71.9, 72.0, 72.2, 72.3, 72.5 (C2, C5), 73.0, 73.2, 73.4 (C3), 80.6 (C2$^A$), 81.60, 81.67 (C4), 82.3 (C4$^A$), 100.4 (C1$^A$), 101.9, 102.0 (C1); FABMS calcd for $C_{46}H_{79}O_{35}N_3$ 1206.4510 (M+H), found 1206.4498.

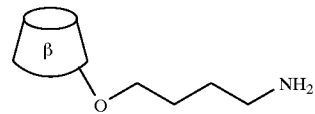

EXAMPLE 11

2-O-Monohexenyl-α-cyclodextrin

To a solution of dried α-cyclodextrin (2.5 g, 2.57 mmol) in DMSO (20 mL) was added lithium hydride (40 mg, 2 eq).

The mixture was stirred under Argon until the solution became clear (24 h). To this solution was added 6-bromo-1-hexene (850 mg, 2 eq) and lithium iodide (10 mg). The mixture was allowed to stand at 70° C. for 10 h, TLC on silica gel (CH$_3$CN—H$_2$O, 4:1) showed three products having Rf values of 0.50, 0.70, 0.09, and corresponding respectively to dihexenyl, monohexenyl-α-cyclodextrins, and starting material. The residue obtained after concentration of the solvent in vacuo was applied on a silica gel column (4×40 cm) eluted with CH$_3$CN—H$_2$O, L9:1 (1L) then 4:1 (1.5L). The pure fractions of monohexenyl-α-cyclodextrin were combined, then concentrated in vacuo to give a solid (750 mg, 30%). The NMR spectra showed that the alkylation has occurred only on C2 position; mp 230° C. (dec); [α]$^{25}$ +109.4° (c 0.27, DMSO); $^1$H NMR (DMSO-d6, 300 MHz, the A notation refers to the glucose unit bearing the hexenyl group): δ1.30–1.60 (m, 4H, hexenyl), 1.95–2.10 (m, 2H, hexenyl), 3.10–3.20 (m, 1H, H2$^A$), 3.20–3.50 (m, H2, H4, H$_2$O), 3.50–3.70 (m, 18H, H5, H6), 3.70–3.85 (m, 7H, H3, He, Hd), 3.85–3.95 (m, 1H, H3$^A$), 4.40–4.60 (m, 6H, OH6), 4.70–4.85 (m, 5H, H1), 4.90–5.05 (m, 3H, H1$^A$, Ha, Hb), 5.35–5.90 (m, 12H, OH2, OH3, Hc); $^{13}$C NMR (DMSO-d6, 75.5 MHz, the A notation refers to the glucose unit bearing the hexenyl group): δ24.6, 28.9, 33.0 (hexenyl), 60.0 (c6), 71.6, 71.9, 72.2 (C2, C5, hexenyl), 72.9, 73.2, 73.3 (C3), 80.4 (C2$^A$), 82.2, 82.4, 82.7 (C4), 100.2 (C1$^A$), 102.1, (C1), 115.0 (hexenyl), 138.7 (hexenyl); FABMS C$_{42}$H$_{70}$O$_{30}$ 1094 (M+K, glycerol/KI as matrix).

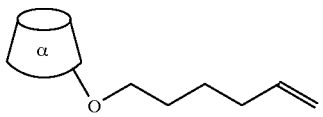

Example 12

6-Monoamino-6-deoxy-α-cyclodextrin

A solution of 6-azido-6-deoxy-α-cyclodextrin (200 mg, 0.2 mmol) in MeOH—H$_2$O, 1:1 (50 mL) was reduced with palladium on charcoal (10% 20 mg) at 30 psi of hydrogen on a Parr hydrogenator for 18 h. After removal of the catalyst by filtration, the solution was evaporated to dryness to give 6-amino-6-deoxy-α-cyclodextrin (180 mg, 90%). Rf 0.20 (n-PrOH—H$_2$ONH$_4$OH, 6:2:1); mp 180° C. (dec) (lit. 200° C. (dec), Carbohydr. Res., 1971, 18, 29–37); [α]$^{25}$ +135° (c 0.38, H$_2$O) (lit.+117° (c 0.4, H$_2$O), Carbohydr. Res., 1971, 18, 29–37); IR (KBr) 3400 (OH, NH$_2$); $^1$H NMR (D$_2$O, 300 MHz, the A notation refers to the glucose unit bearing the amino group): δ2.92 (dd, 1H, J$_{gem}$=12.7, J$_{H6-H5}$=7.3, H6$^A$), 3.20 (d, 1H, J$_{gem}$=12.7, H6$^{1A}$), 3.50 (t, 1H, J$_{H4-H3}$=J$_{H4-H5}$= 8.9, H4$^A$), 3.58–3.74 (m, 11H, H2, H4), 3.82–3.98 (m, 16H, H5, H6), 4.20 (t, 6H, J$_{H3-H2}$=JH$_{H3-H4}$=9.3, H3), 5.10 (s, 6H, H1); $^{13}$C NMR (D$_2$O, 75.5 MHz, the A notation refers to the glucose unit bearing the amino group): δ39.9 (C6$^A$), 58.9 (C6), 70.2 (C5), 70.5 (C2), 71.7 (C3$^A$), 71.8 (C3), 79.7 (C4), 81.5 (C4$^A$) 99.7 (C1$^A$), 99.8 (C1); FABMS calcd for C$_{36}$H$_{61}$O$_{29}$N 972.3407 (M+H), found 972.3448.

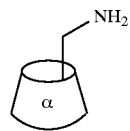

EXAMPLE 13

6-Monobenzyloxycarbonylamino-6-deoxy-α-cyclodextrin

To a solution of 6-amino-6-deoxy-α-cyclodextrin (170 mg, 0.17 mmol) in water (20 mL) were added sodium bicarbonate (600 mg), dichloromethane (5 mL) and benzyl chloroformate (250 μL, 10 eq). The mixture was stirred overnight at room temperature, then extracted with dichloromethane (2×10 mL). The aqueous phase was concentrated to about 10 mL, then applied on a reversed phase column (Lichroprep C18, 2×20 cm) eluting with H$_2$O (50 mL), MeOH—H$_2$O, 10% (100 mL), then MeOH—H$_2$O, 50% (100 mL). The pure fractions were combined and concentrated to dryness to give 6-benzyloxycarbonylamino-6-deoxy-α-cyclodextrin (170 mg, 87%); Rf 0.40 (CH$_3$CN—H$_2$O, 4:1); mp 195° C. (dec); [α]$^{25}$+81° (c 0.11, H$_2$O); IR (KBr) 3400 (OH), 1710 (CO); $^1$H NMR (DMSO-d6, 300 MHz, the A notation refers to the glucose unit bearing the benzyloxycarbonylamino group): δ3.15–3.85 (m, H2, H3, H4, H5, H6), 4.40–4.75 (m, 5H, OH6), 4.75–4.80 (m, 5H, H1), 4.86 (d, 1H, J$_{H1-H2}$=3.3, H1$^A$), 4.92 (d, 1H, J$_{gem}$=12.6, CH$_2$Ph), 5.20 (d, 1H, J$_{gem}$=12.8, $^{CH}_2$Ph), 5.60–6.10 (m, 12H, OH2, OH3), 7.25, 7.40 (m, 5H, aromatic), 7.50–7.60 (m, 1H, NH); $^{13}$C NMR (DMSO-d6, 75.5 MHz, the A notation refers to the glucose unit bearing the benzyloxycarbonylamino group); δ60.3, 60.5 (C6), 65.3 (C6$^A$), 70.5 (C5$^A$), 72.2, 72.5, 72.7, 72.8, 73.3 (C2, C5,CH$_2$Ph), 73.6, 73.65 (C3), 82.6, 82.7, 82.8 (C4), 84.5 (C4$^A$), 102.1 (C1$^A$), 102.3 (C1), 127.7, 128.5, 137.8 (aromatic), 175.7 (CO); FABMS calcd for C$_{44}$H$_{67}$O$_{31}$N 1128.3595 (M+Na), found 1128.3557.

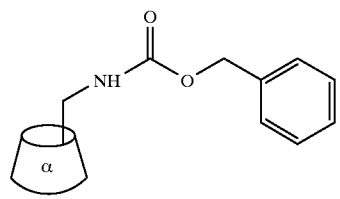

EXAMPLE 14

6-Benzyloxycarbonylamino-6'-azido-6,6'-dideoxy-α-cyclodextrins

6-Benzyloxyamino-6-deoxy-α-cyclodextrin (200 mg, 0.18 mmol) was dried in vacuo at 80° C. for 20 h. After that, DMF (10 mL) was added, followed by triphenylphosphine (120 mg, 2.5 eq), lithium azide (100 mg, 2.5 eq) and carbon tetrabromide (150 mg, 2.5 eq). The yellow solution was stirred at room temperature for 4 h. TLC on silica gel (CH$_3$CN—H$_2$O, 4:1) showed three major products having Rf values of 0.75, 0.56, 0.40, and corresponding respectively to trisubstituted (side product), disubstituted (product), and monosubstituted α-cyclodextrin (starting material). After addition of methanol (2 mL), the solution was concentrated in vacuo, then the residue was applied on a silica gel column (2.5×45 cm). Elution with CH$_3$CN—H$_2$O 95:5 then 9:1) gave pure 6-benzyloxycarbonylamino-6'-azido-6,6'-dideoxy-α-cyclodextrins (90 mg, 45%); mp 216° C. (dec); [α]$^{25}$+114.0° (c 0.22, MeOH); IR (KBr) 3400 (OH), 2100 (N$_3$, 1720 (CO); 1H NMR (DMSO-d6, 400 MHz, the A, and X notation refers to the glucose units bearing the azide and NHCBZ group, X=B, C, D, E, or F): δ3.15–3.85 (m, H2, H3, H4, H5, H6), 4.38–4.62 (m, 4H, OH6), 4.65–5.08 (m, 8H, H1, C$\underline{H}$2-Ph), 5.38–5.62 (m, 12H, OH2, OH3), 7.18–7.22 (m, 1H, NH), 7.25–7.42 (m, 5H, Ph); $^{13}$C NMR (DMSO-d6, 100.6 MHz, the A, and X notation refers to the glucose units bearing the azide and NHCBZ groups, X=B, C, D, E, or F): δ51.2 (C6$^A$), 59.83, 59.89, 59.90, 59.93 (C6), 65.2, 65.3 (C6$^X$), 70.0, 70.1, 70.2, 70.35, 70.37, 70.5 (C5$^A$, C5$^X$), 71.80, 71.87, 71.92, 71.96, 72.0, 72.11, 72.13, 72.27, 72.3 (C2, C5, $\underline{C}$H2Ph), 72.8, 72.9, 73.1, 73.20, 73.26, 73.3 (C3), 81.94, 81.95, 82.04, 82.06, 82.11, 82.12, 82.2 (C4), 83.1, 83.24, 83.26, 83.6, 83.8 (C4$^A$, C4$^X$), 101.7, 102.00, 102.05, 102.17, 102.20 (C1), 127.70, 127.78, 127.83, 128.36, 128.40, 137.18, 137.20, 137.23, 137.25 (Phenyl), 156.29, 156.31, 156.33, 156.35, 156.37 (CO); FABMS calcd for C$_{44}$H$_{66}$O$_{30}$N$_4$ 1131.3840 (M+H), found 1131.3730.

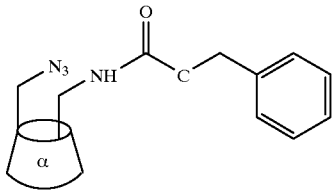

EXAMPLE 15

2-O-(5-Chloro pentyl)-β-cyclodextrin

To a solution of dried β-cyclodextrin (1.8 g, 1.58 mmol) in DMSO (15 mL) was added lithium hydride (25 mg, 2 eq). The mixture was stirred under Argon until the solution became clear (24 h). To this solution was added 1-iodo-5-chloropentane (740 mg, 2 eq). The mixture was allowed to stand at 70° C. for 12 h. TLC on silica gel (CH$_3$CN—H$_2$O, 4:1) showed three products corresponding to dialkyl, monoalkyl-β-cyclodextrin, and starting material. The solution was concentrated in vacuo, then applied on a silica gel column (4×40 cm). Elution with CH$_3$CN—H$_2$O, 9:1 removed the dialkyl derivative. Monoalkyl derivative, and starting material were eluted with CH$_3$CN—H$_2$O, 4:1. The pure fractions of 2-O-(5-chloropentyl)-β-cyclodextrin were combined, then concentrated in vacuo to give a solid (480 mg, 25%). Rf 0.20 (CH$_3$CN—H$_2$O, 4:1); mp 208° C. (dec); [α]$^{25}$+122.9° (c 0.24, DMSO); $^1$H NMR (DMSO-d6, 400 MHz, the A notation refers to the glucose unit bearing the chloropentyl group): δ1.35–1.62 (m, 6H pentyl), 3.20 (dd, 1H, J$_{2-1}$=3.8, J$_{2-3}$=9.8, H2$^A$), 3.25–3.40 (m, H2, H4, $^{CH}$2—Cl, H$_2$O), 3.50–3.70 (m, 27H, H3, H5, H6), 3.70–3.80 (m, 3H, H3$^A$, pentyl), 4.35–4.45 (m, 7H, OH6), 4.78–4.85 (m, 6H, H1), 4.95 (d, 1H, J$_{1-2}$=3.8, H1$^A$), 5.55–5.90 (m, 13H, OH2, OH3); $^{13}$C NMR (DMSO-d6, 100.6 MHz, the A notation refers to the glucose unit bearing the chloropentyl group): δ23.5, 29.3, 32.6, 46.2 (pentyl), 60.8 (C6), 72.2 (pentyl), 72.5, 72.6, 72.9, 73.1, 73.3 (C2, C5), 73.6, 73.9, 74.0 (C3), 81.5 (C2$^A$), 82.4, 82.6, 83.1 (C4), 101.2 (C1$^A$), 102.7, 102.8 (C1); FABMS.

If it is desired to prepare the corresponding azide derivative, one can carry out the alkylation with 1-bromo-5-chlorpentane and a catalytic amount of lithium iodide to form the desired compound. To this end, the reaction can be carried out under the same conditions with respect to the compound α-cyclodextrin to gave a mixture of C2 and C6 isomers.

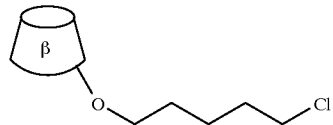

EXAMPLE 16

2-O-(5-Aminopentyl)-β-cyclodextrin

Essentially the same procedure was used to give the product as a colorless solid. Rf 0.31 (n-butanol-acetic acid-water/pyridine, 15:3:12:10); mp 205° C. (dec); [α]$^{25}$+131.5° (c 0.20, H$_2$O); $^1$H NMR (DMSO-d6, 300 MHz, the A notation refers to the glucose unit bearing the aminopentyl group): δ1.24–1.55 (m, 6H, pentyl), 2.52–2.68 (m, 2H, pentyl), 3.20 (dd, 1H, J$_{H2-H1}$=2.8, J$_{H2-H3}$=9.9, H2$^A$), 3.22–3.85 (m, 43H, H2, H3, H4, H5, H6, pentyl), 4.78–4.88 (m, 6H, H1), 4.94 (d, 1H J$_{H1-H2}$=3.0, H1$^A$); $^{13}$C NMR (DMSO-d6, 75.5 MHz, the A notation refers to the glucose unit bearing the aminopentyl group): δ22.4, 28.9, 30.0, 40.0 (pentyl), 59.8 (C6), 71.7, 72.0, 72.3, 72.6 (C2, C5, pentyl), 73.0, 73.1 (C3), 80.5 (C2$^A$), 81.40, 81.44, 81.5, 81.6 (C4), 82.1 (C4$^A$), 100.3 (C1$^A$), 101.7, 101.9, 102.0 (C1); FABMS calcd for C$_{47}$H$_{81}$O$_{35}$N 1220.4667 (M+H), found 1220.4746.

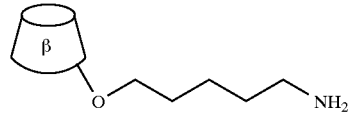

EXAMPLE 17

2-O-(5-Aminopentyl)-α-cyclodextrin

2-O-(5-azidopentyl)-α-cyclodextrin (86.6 mg, 0.08 mmol) was suspended in dioxane-methanol 10:2 mL. To the slightly milky solution was added 100 mg of triphenylphosphine. After 1 hour, 1 mL of concentrated ammonia was added, and stirring was continued for 20 h. After removal of the solvent in vacuo, the white residue was suspended in water (20 mL), then washed twice with dichloromethane (10 mL). The solution was concentrated in vacuo, then applied on a reverse phase column (Lichroprep C18, 2×20 cm). Elution with 500 mL of water gave the pure amine (68 mg, 80%) mp 195° C. (dec); [α]$^{25}$+117.6° (c 0.34, H$_2$O); $^1$H NMR (D$_2$O, 300 MHz): δ1.67–1.80 (m, 2H, pentyl), 1.88–2.05 (m, 4H, pentyl), 3.16 (t, J=6.8, 2H, C$\underline{H}_2$—NH$_2$), 3.65–4.10 (m, 38H, H2, H3, H4, H5, H6, pentyl), 4.98–5.08 (m, 6H, H1); $^{13}$C NMR (D$_2$O, 75.5 MHz, the A notation refers to the glucose unit bearing the aminopentyl group): δ20.5, 24.8, 26.9, 37.7 (pentyl), 58.7, 58.8 (C6), 69.80, 69.84, 69.9, 70.0, 70.1, 70.3, 70.4, 70. 8, 71.6, 71.7, 71.8 (C2, C3, C5, pentyl), 77.2 (C2$^A$), 78.9, 79.5, 79.6, 79.8 (C4), 99.3 (C1$^A$), 99.6, 99.7, 99.9 (C1); FABMS calcd for C$_{41}$H$_{71}$O$_{30}$N 1058.4139 (M+H), found 1058.4062.

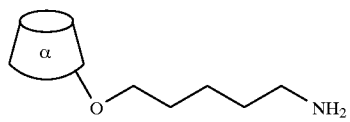

EXAMPLE 18

2-O-Carboxymethyl-α-cyclodextrin

To a solution of 2-O-monoallyl-α-cyclodextrin (310 mg, 0.3 mmol) in pyridine (5 mL) was added acetic anyhdride (5 mL), and the mixture was heated at 80° C. for 20 h. The residue obtained after usual work-up was dissolved in $CH_2Cl_2$—MeOH (10:10 mL). Through this solution was bubbled ozone at −78° C. until TLC indicated disappearance of starting material (15 min). The residue obtained after usual work-up was dissolved in MeOH (10 mL) and isobutene (3 mL). To this solution cooled at 0° C. was added dropwise solution of sodium chlorite (240 mg) and sodium dihydrogenphosphate in water (3 mL). The reactin mixture was stirred at room temperature overnight, then the residue obtained after removal of the solvents under vaccum was dissolved in water. The solution was acidified to pH 4 with HCl N and extracted with ethyl acetate. The organic layers were dried and concentrated in vacuo to give a residue which was purified by flash chromatography on a silica gel column. Stepwise elution with EtOAc-MeOH, 6:1, 3:1, then 1:1 gave the desired compound. The deacetylation was done as usual to give 2-O-carboxymethyl-α-cyclodextrin (210 mg, 66% from the allyl), mp 224° C. (dec); $[\alpha]^{25}$=129.6° (c 0.28, $H_2O$); IR (KBr) 3400 (OH), 1720 (CO); $^1H$ NMR ($D_2O$, 400 MHz, the A notation refers to the glucose unit bearing the carboxymethyl group): δ3.42–3.58 (m, H2, H4), 3.58–3.85 (m, 18H, H5, H6), 3.85–3.94 (m, 5H, H3), 4.04 (t, 1H, $J_{H3-H4}$=9.0, H3$^A$), 4.28 (d, 1H, $J_{gem}$=16.5, $CH_2$COOH), 4.33 (d, 1H, $J_{gem}$=16.5, $CH_2$COOH), 4.92–5.00 (m, 5H, H1), 5.17 (d, 1H $J_{H1-H2}$=3.2, H1$^A$); $^{13}C$ NMR ($D_2O$, 100.6 MHz, the A notation refers to the glucose unit bearing the carboxymethyl group): δ60.9, 61.1 (C6), 69.9, (CH2-COCH), 72.0, 72.30, 72.37, 72.5, 72.9, 73.1, 73.3, 73.6, 73.8, 73.90, 74.0 (C2, C3, C5), 80.9 (C2$^A$), 81.8, 82.1, 82.5 (C4), 100.3 (C1$^A$), 102.00, 102.06 (C1), 173.8 (CO); FABMS calcd for $C_{38}H_{62}O_{32}$ 1031.3302 (M+H), found 1031.3281.

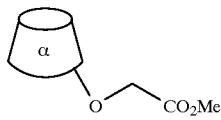

EXAMPLE 19

6-Azido-2-O-carboxymethyl-α-cyclodextrins

Treatment of 6-monoazido-2-O-monoallyl-α-cyclodextrins (320 mg, 0.3 mmol) with acetic anhydride (10 mL) in pyridine (10 mL) at 60° C. for 20 hours gave, after usual work-up, the corresponding peracetylated derivative. Ozonolysis in $CH_2Cl_2$/MeOH at −78° C. followed by treatment with methyl sulfide gave the corresponding aldehyde. Oxydation with sodium chlorite (240 mg) in the presence of sodium phosphate monobasic (240 mg), methyl isobutene (3 mL), water (3 mL), and methanol (10 mL) at 0° C. to room temperature for 20 hours, gave the corresponding acid. Protection of the acid, dissolved in methanol, with diazomethane in ether followed by purification on silica gel column ($CH_2Cl_2$/MeOH, 50:1 to 40:1 as eluent) gave the peracetylated 6-azido-2-O-carboxymethyl-methyl ester-α-cyclodextrins (320 mg, 64%). $^1H$ NMR ($CDCl_3$, 400 MHz, the A notation refers to the glucose unit bearing the carboxymethyl-methyl ester group): δ1.80–2.34 (m, C H3-CO), 3.31 (dd, $J_{2-1}$=2.3, $J_{2-3}$=9.9, H2$^A$), 3.55–3.90 (m, H4, $CH_2N_3$), 3.92–4.55 (m, H5, H6, $CH_2$COOH), 4.62–4.82 (m, H2), 4.82–5.20 (m, H1), 5.25–5.78 (m, H3); $^{13}C$ NMR ($CDCl_3$, 100.6 MHz, the A notation refers to the glucose unit bearing the carboxymethyl-methyl ester group): δ20.3. 20.6, 20.8 ($CH_3CO$), 51.1, 51.2, 51.4 ($CH_2N_3$), 51.80, 51.86 ($CO_2$ $CH_3$), 62.9, 63.1, 63.2 (C6), 68.2, 68.3 (—$CH_2$—$CO_2CH_3$), 68.5–73.6 (C2, C3, C5), 75.7–79.8 (C2$^A$, C4), 95.6–99.4 (C1), 168.9–170.2 ($CH_3CO$, —$CO_2CH_3$).

Deprotection of the above compound (130 mg, 0.07 mmol) with NaOH 1N in MeOH at room temperature overnight gave, after purification on reversed phase column (Lichroprep C18, 2×20 cm, stepwise elution with $H_2O$ (350 mL), then 10% MeOH (200 mL)), 6-azido-2-O-carboxymethyl-α-cyclodextrins as a colorless solid (64 mg, 80%) mp 210° C. (dec); $[\alpha]^{25}$+127.0° (c 0.20, $H_2O$); IR (KBr) 3400 (OH), 2100 ($N_3$), 1720 (CO); $^1H$ NMR ($D_2O$, 400 MHz, the A notation refers to the glucose unit bearing the carboxymethyl group): δ3.52–3.78 (m, H2, H4, $CH_2N3$), 3.78–4.05 (m, H3, H5, H6), 4.12–4.19 (m, H3$^A$), 4.41 (d, 1H, $J_{gem}$=17.4, $CH_2$COOH), 4.48 (d, 1H, $J_{gem}$=17.4, $CH_2$COOH), 5.05–5.12 (m, 5H, H1), 5.25–5.32 (m, 1H, H1$^A$); $^{13}C$ NMR ($D_2O$, 100.6 MHz, the A notation refers to the glucose unit bearing the carboxymethyl group): δ52.1 ($CH_2N_3$), 61.1, 61.2 (C6), 71.4 ($CH2$-COOH), 72.1–74.2 (C2, C3, C5), 80.8, 81.0 (C2$^A$), 82.0–83.8 (C4), 100.5 (C1$^A$), 102.2 (C1), 174.2 (CO); FABMS.

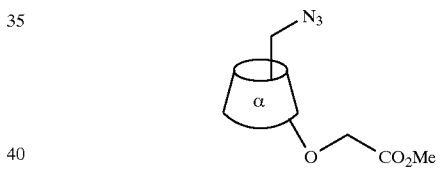

The novel compounds of this invention have properties similar to those of the known cyclodextrins.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A compound of the formula

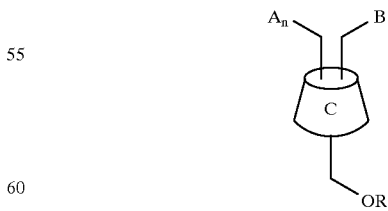

wherein C is cyclodextrin, A is amino, azido or aralkoxycarbonyl-substituted amino, wherein said aralkoxy has 7 to 10 carbon atoms and n is 0, 1, 2 or 3, B is hydroxyl, or one of A and B is azido and the other is aralkoxycarbonyl-substituted amino, R is alkenyl of 2 to 6 carbon atoms, aminoalkyl of 3 to 6 carbon atoms, or azidoalkyl of 1 to 6 carbon atoms, wherein the OR group is in at least one of the -2 and -3 positions and with the proviso that when n is 0, R is aminoalkyl of 3 to 6 carbon atoms, or azidoalkyl; and where A and when B is not hydroxyl, B are attached at the cyclodextrin deoxy primary hydroxyl sites, and R forms an etherified secondary hydroxyl group wherein the A, B groups are present exclusively at the primary hydroxyl side and the R group is present exclusively at the secondary hydroxyl side of the cyclodextrin.

2. A compound of claim 1, wherein n is 1, 2 or 3, R is alkenyl of 2 to 6 carbon atoms.

3. A compound of claim 2, wherein A is azido and R is alkenyl.

4. A compound of claim 3 selected from the group consisting of 2-0-allyl-6-azido-6-deoxy-alpha-cyclodextrin, 2-0-allyl-6,6'-diazido-6,6'-dideoxy-alpha-cyclodextrin, and 2-0-allyl-6,6',6"-triazido-6,6',6"-trideoxy-alpha-cyclodextrin.

5. A compound of claim 2, wherein A is amino and R is alkenyl.

6. A compound of claim 2, wherein A is aralkoxy carbonylamino.

7. A compound of claim 2, wherein one of A and B is azido and the other is aralkoxy carbonylamino.

8. A compound of claim 1, wherein n is 0 and R is azidoalkyl.

9. A compound of claim 8, selected from the group consisting of 2-O-azidopropyl-beta-cyclodextrin, 2-O-azidobutyl-beta-cyclodextrin, 2-O-azidopentyl-beta-cyclodextrin, 3-O-azidopropyl-beta-cyclodextrin, 3-O-azidobutyl-beta-cyclodextrin, and 3-O-azidopentyl-beta-cyclodextrin.

10. A compound of claim 1, wherein n is O and R is aminoalkyl.

11. A compound of claim 10, selected from the group consisting of 2-O-aminopropyl-beta-cyclodextrin, 2-O-aminobutyl-beta-cyclodextrin, and 2-O-aminopentyl-beta-cyclodextrin.

12. A process of preparation of a compound of the formula

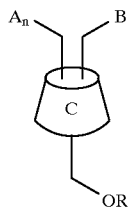

wherein C is cyclodextrin, A is amino, azido or aralkoxy carbonylamino, wherein said aralkoxy has 7 to 10 carbon atoms and n is 0, 1, 2 or 3, B is hydroxyl, or one of A and B is azido and the other is aralkoxy carbonylanino, R is alkenyl of 2 to 6 carbon atoms, aminoalkyl of 3 to 6 carbon atoms, or azidoalkyl of 1 to 6 carbon atoms, wherein the OR group is in at least one of the -2 and -3 positions, and with the proviso that when n is 0, R is aminoalkyl of 3 to 6 carbon atoms, or azidoalkyl; and wherein A and when B is not hydroxyl, B are attached at the cyclodextrin deoxy primary hydroxyl sites, and R forms an etherified secondary hydroxyl group wherein the A, B groups are present exclusively at the primary hydroxyl side and the R group is present exclusively at the secondary hydroxyl side of the cyclodextrin (a) when A is azido, B is hydroxyl, n is 1,2, or 3 reacting a cyclodextrin of formula I, wherein C is cyclodextrin, B is hydroxyl, R is alkenyl of 2 to 6 carbon atoms, with alkali metal azide, triphenyl phosphine, and carbon tetrabromide, (b) when A is azido, B is aralkoxy carbonylamino, wherein said aralkoxy has 7 to 10 carbon atoms, n is 1, 2, or 3, reacting a cyclodextrin of formula I, wherein C is cyclodextrin, A is aralkoxy carbonylamino, wherein said aralkoxy has 7 to 10 carbon atoms, B is hydroxyl, R is alkenyl of 2 to 6 carbon atoms, with alkali metal azide, triphenyl phosphine, and carbon tetrabromide, (c) when A is amino, B is hydroxyl, n is 1, 2, or 3, reacting a cyclodextrin of formula I, wherein C is cyclodextrin, A is azido, B is hydroxyl, R is alkenyl of 2 to 6 carbon atoms, with hydrogen in the presence of palladium on charcoal, (d) when A is aralkoxy carbonylamino, B is hydroxyl, n is 1, 2, or 3, reacting a cyclodextrin of formula I wherein C is cyclodextrin, A is azido, B is hydroxyl, R is alkenyl of 2 to 6 carbon atoms, with sodium bicarbonate and aralkyl chloroformate, wherein said aralkyl has 7 to 10 carbon atoms, (e) when n is 0, B is hydroxyl, R is azidoalkyl of 1 to 6 carbon atoms reacting cyclodextrin with alkali metal hydride in a first step, and the product thereof with halo-, azido-alkane in a second step, and (f) when n is 0, B is hydroxyl, R is aminoalkyl of 3 to 6 carbon atoms, reacting a cyclodextrin of formula I, wherein n is 0, B is hydroxyl, R is azidoalkyl of 3 to 6 carbon atoms with triphenylphosphine in the presence of ammonia.

13. A process of claim 12, wherein A is azido, B is hydroxyl, n is 1, 2 or 3 comprising reacting a cyclodextrin of formula I, wherein C is cyclodextrin, B is hydroxyl, R is alkenyl of 2 to 6 carbon atoms, with alkali metal azide, triphenyl phosphine, and carbon tetrabromide.

14. A process of claim 13, wherein C is selected from the group consisting of alpha-, beta- and gamma-cyclodextrin.

15. A process of claim 12, wherein A is azido, B is aralkoxy carbonylamino, and said aralkoxy has 7 to 10 carbon atoms, n is 1, 2, or 3, comprising reacting a cyclodextrin of formula I, wherein C is cyclodextrin, A is aralkoxy carbonylamino, wherein said aralkoxy has 7 to 10 carbon atoms, B is hydroxyl, R is alkenyl of 2 to 6 carbon atoms, with alkali metal azide, triphenyl phosphine, and carbon tetrabromide.

16. A process of claim 12 wherein A is amino, B is hydroxyl, n is 1, 2, or 3, comprising reacting a cyclodextrin of formula I, wherein C is cyclodextrin, A is azido, B is hydroxyl, R is alkenyl of 2 to 6 carbon atoms, with hydrogen in the presence of palladium on charcoal.

17. A process of claim 12, wherein A is aralkoxy carbonylamino, B is hydroxyl, n is 1, 2, or 3, comprising reacting a cyclodextrin of formula I wherein C is cyclodextrin, A is azido, B is hydroxyl, R is alkenyl of 2 to 6 carbon atoms, with sodium bicarbonate and aralkyl chloroformate, wherein said aralkyl has 7 to 10 carbon atoms.

18. A process of claim 12 wherein n is O, B is hydroxyl, R is aminoalkyl of 1 to 6 carbon atoms, comprising reacting cyclodextrin with alkali metal hydride in a first step, and the product thereof with haloazidoalkane in a second step.

19. A process of claim 12 wherein n is O, B is hydroxyl, R is aminoalkyl of 1 to 6 carbon atoms, comprising reacting a cyclodextrin of formula I, wherein n is O, B is hydroxyl, R is azidoalkyl of 1 to 6 carbon atoms with triphenylphosphine in the presence of ammonia.

* * * * *